United States Patent
Kastl

(10) Patent No.: US 11,140,838 B2
(45) Date of Patent: Oct. 12, 2021

(54) SYSTEM AND METHOD FOR VARIABLE RATE, HIGH SPEED IRRIGATION CONTROL

(71) Applicant: Valmont Industries, Inc., Omaha, NE (US)

(72) Inventor: John Kastl, Wahoo, NE (US)

(73) Assignee: Valmont Industries, Inc., Omaha, NE (US)

( * ) Notice: Subject to any disclaimer, the term of this patent is extended or adjusted under 35 U.S.C. 154(b) by 155 days.

(21) Appl. No.: 16/524,227

(22) Filed: Jul. 29, 2019

(65) Prior Publication Data

US 2019/0350145 A1 Nov. 21, 2019

Related U.S. Application Data

(63) Continuation-in-part of application No. 16/059,214, filed on Aug. 9, 2018, now Pat. No. 10,405,505.

(60) Provisional application No. 62/543,463, filed on Aug. 10, 2017.

(51) Int. Cl.
*A01G 25/09* (2006.01)
*A01G 25/02* (2006.01)
*G05B 19/042* (2006.01)
*A01G 25/16* (2006.01)

(52) U.S. Cl.
CPC .......... *A01G 25/092* (2013.01); *A01G 25/02* (2013.01); *A01G 25/09* (2013.01); *A01G 25/16* (2013.01); *G05B 19/0426* (2013.01); *G05B 2219/2625* (2013.01)

(58) Field of Classification Search
CPC ...... A01G 25/09; A01G 25/16; A01G 25/092; A01G 25/02; G05B 19/0426; G05B 2219/2625
USPC ......... 239/728, 729, 730, 731, 732, 733, 69; 701/50
See application file for complete search history.

(56) References Cited

U.S. PATENT DOCUMENTS

| | | | |
|---|---|---|---|
| 4,133,705 A | 2/1979 | Doll | |
| 4,630,773 A | 12/1986 | Ortlip | |
| 5,911,363 A | 6/1999 | Oligschlaeger | |
| 5,955,973 A | 9/1999 | Anderson | |
| 6,007,004 A | 12/1999 | Unruh | |
| 6,431,475 B1 | 8/2002 | Williams | |
| 6,616,374 B2 | 9/2003 | Starr | |
| 6,883,726 B2 | 4/2005 | Polk et al. | |
| 7,073,735 B2 | 7/2006 | Wubben et al. | |
| 7,384,008 B1 | 6/2008 | Malsam | |
| 10,405,505 B2 * | 9/2019 | Kastl | A01G 25/16 |
| 10,582,671 B2 * | 3/2020 | Abts | A01G 25/16 |
| 2003/0066912 A1 * | 4/2003 | Krieger | A01G 25/092 239/731 |

(Continued)

*Primary Examiner* — Steven J Ganey
(74) *Attorney, Agent, or Firm* — Milligan PC LLO

(57) ABSTRACT

The present invention provides a system and method which combines sensor inputs, control systems, field mapping, motor controls, and high speed and variable speed motor designs within an irrigation machine. According to a preferred embodiment, the present invention provides systems which are capable of full torque operation, even at speeds less than the rated speed of the motor. According to further preferred embodiments, the present invention utilizes a combination of motor types including Switch Reluctance, DC Permanent Magnet and AC Permanent Magnet motors in combination with Variable Frequency Drives.

20 Claims, 4 Drawing Sheets

(56) References Cited

U.S. PATENT DOCUMENTS

| | | |
|---|---|---|
| 2004/0195408 A1 | 10/2004 | Starr |
| 2005/0211794 A1 | 9/2005 | Clark et al. |
| 2010/0032493 A1 | 2/2010 | Abts et al. |
| 2013/0018553 A1 | 1/2013 | Malsam |
| 2015/0216108 A1 | 8/2015 | Roth et al. |
| 2016/0368011 A1 | 12/2016 | Feldhaus et al. |
| 2017/0000046 A1 | 1/2017 | Muff |
| 2017/0014851 A1 | 1/2017 | Curilla |
| 2017/0055469 A1 | 3/2017 | Abts et al. |

* cited by examiner

SYSTEM AND METHOD FOR VARIABLE RATE, HIGH SPEED IRRIGATION CONTROL

RELATED APPLICATIONS

The present application is a Continuation-In-Part of U.S. application Ser. No. 16/059,214 filed Aug. 9, 2018, which further claims priority to U.S. Provisional Application No. 62/543,463 filed Aug. 10, 2017.

BACKGROUND AND FIELD OF THE PRESENT INVENTION

Field of the Present Invention

The present invention relates generally to a system and method for irrigation management and, more particularly, to a system and method for incorporating high speed, variable rate motors to manage the operational effectiveness of modern irrigation machines.

Background of the Invention

In the past, irrigation machines have utilized a number of different electric motor technologies to provide motive power to move the irrigation machine through the field. Motor types such as Brushed DC, and 3-Phase AC induction have been used. In most cases these motors were controlled with a simple on-off contactor (electro-mechanical switch) relay that was operated by either 1) a pulse width modulated signal from a control panel which was used to set the speed of the machine by operating the end or master drive unit (span tower) of the irrigation machine, or 2) from an alignment switch that was used to ensure alignment of intermediate or slave drive units to the master drive unit.

In some past products, a 3-Phase AC induction motor was coupled with a variable speed drive to provide constant movement instead of the usual start-stop movement of a traditional drive unit. There are a number of advantages to this type of system, among them: the reduction in stress on the drivetrain and associated components (i.e. gearbox gear teeth, span structures, drive unit structure, etc.); improved water uniformity; the reduction or elimination of coasting of the drive unit during the off cycle (which can lead to poor water or applicant uniformity); and reduced tire slippage. However, this type of system has several disadvantages as well including cost and complexity. However, the primary disadvantage is that the output torque of 3-Phase AC induction motors decreases as their operating speed decreases below the rated speed of the motor. This is a significant disadvantage for an irrigation machine because irrigation machines are typically required to operate at low speeds (i.e. 10-25% of full speed) during irrigation and then operate at a higher speed (i.e. 95-100% of full speed) to move the machine quickly out of the way for other farming operations or to re-position the machine for another irrigation cycle.

During irrigation, maximum torque is often needed to carry heavy, water-filled irrigation spans through a field (often on rolling terrain) and through deep wheel ruts in the field. In addition, the wheel ruts may be filled with large amounts of mud that needs to be pushed out of the way by the irrigation machine's tires. As a result, irrigation machines with a 3-Phase AC induction motor coupled to a variable-frequency drive are limited in their ability to operate at low speeds. To compensate for this, the prior art systems in some cases have used a start-stop mode of operation at low speeds (thus eliminating some of the advantages of constant movement) and have utilized oversized motors to provide sufficient torque during irrigation (resulting in increased costs).

While helpful, the prior art fails to teach or suggest any system which enables the use of high speed and variable speed motors for use with irrigation machines. In order to overcome the limitations of the prior art, a system is needed which is able to combine high speed and variable speed motors and control systems to maximize the operational effectiveness of modern irrigation machines.

SUMMARY OF THE PRESENT INVENTION

To address the shortcomings presented in the prior art, the present invention provides a system and method which combines sensor inputs, control systems, field mapping, motor controls, and high speed and variable speed motor designs within an irrigation machine. According to a further preferred embodiment, the controller of the present invention may preferably be integrated into the control system of an irrigation machine so that it may control any or all aspects of the irrigation machine to adjust and control the speed of the irrigation machine in response to sensor input (including detected machine alignment, user commanded speed, user commanded rotation etc.) and the like.

According to further preferred embodiments, the present invention provides systems which are capable of full torque operation, even at speeds less than the rated speed of the motor. According to further preferred embodiments, the present invention utilizes a combination of motor types including Switch Reluctance, and DC Permanent Magnet motors in combination with Variable Frequency Drives. As a result, motor designs of the present invention overcome the limitations of Variable Frequency Drive powered AC induction motors while providing the advantages of constant move.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
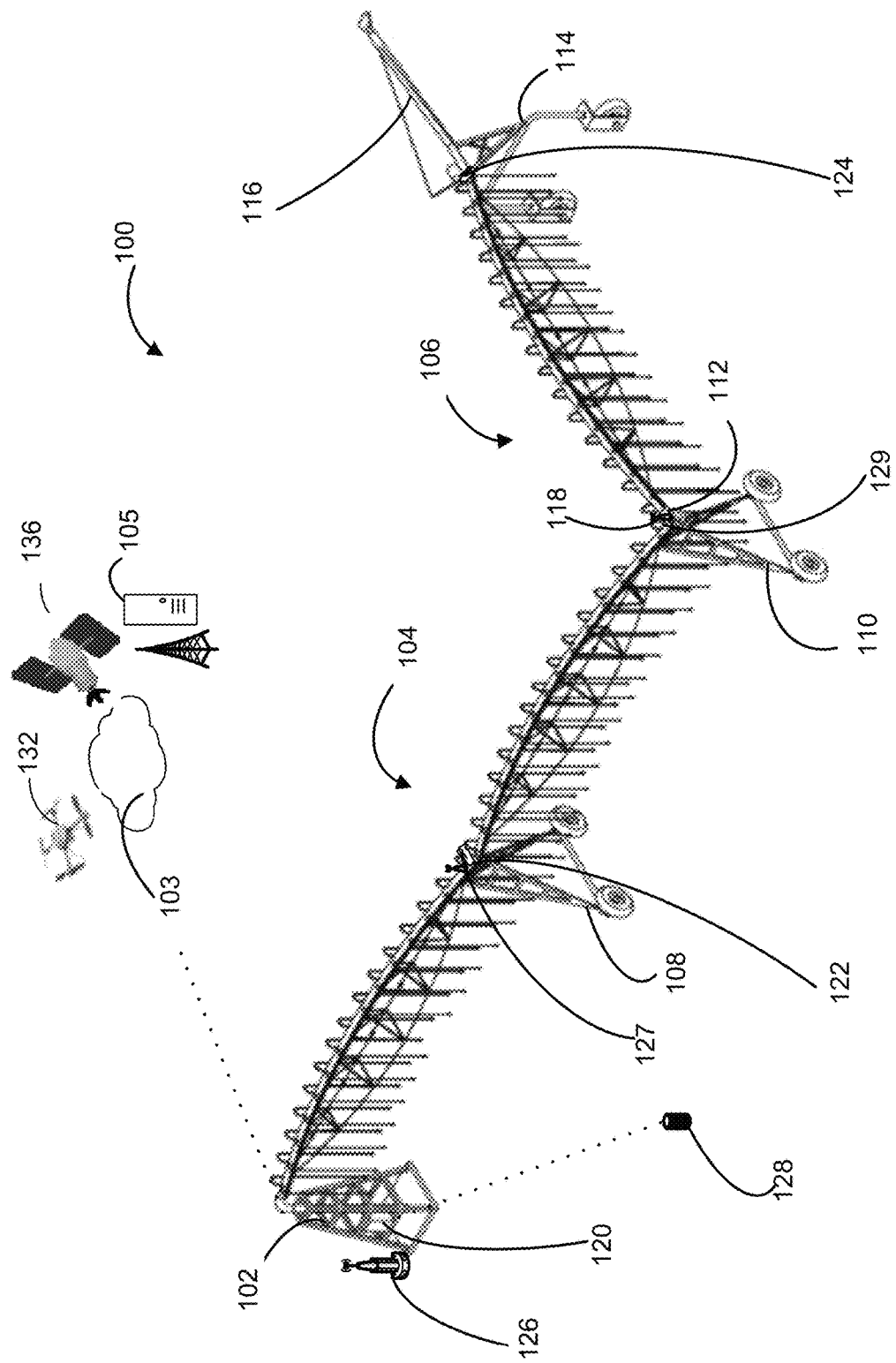
FIG. 1 shows an exemplary irrigation system for use with the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," "module" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods includes: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types.

FIG. 1 illustrates an exemplary self-propelled irrigation system 100 which may be used with example implementations of the present invention. As should be understood, the irrigation system 100 disclosed in FIG. 1 is an exemplary irrigation system onto which the features of the present invention may be integrated. Accordingly, FIG. 1 is intended to be illustrative and any of a variety of systems (i.e. fixed systems as well as linear and center pivot self-propelled irrigation systems; corner systems) may be used with the present invention without limitation.

With reference now to FIG. 1, an exemplary irrigation machine 100 of the present invention preferably may include a main span 104, a center pivot structure 102 and supporting drive towers 108, 110. The exemplary irrigation machine 100 may also include a corner span 106 attached at a connection point 112. The corner span 106 may be supported and moved by a steerable drive unit 114. The corner span 106 may include a boom 116 and an end gun (not shown) and/or other sprayers. Additionally, a position sensor 118 may provide positional and angular orientation data for the system as discussed further below. Further, a central control panel 120 is provided for enclosing on-board computer elements such as elements of the exemplary control device 138 as discussed below. The control panel 120 may also be linked to a transceiver for transmitting and receiving data between system elements, device/internet clouds 103, remote servers 105 and/or the like. In accordance with a further aspect of the present invention, the control panel 120 may be further linked to a remote sensing element such as a sensor suite located on an aerial vehicle 132 (UAV/MAV), satellite 136 and other high-altitude monitoring systems.

Additionally, the system may include and/or receive data from sensors providing in-situ soil data 128 (e.g. moisture content) and/or crop related data. The system may also include image sensors 122, 124 which preferably may include sensors to indirectly determine the moisture levels in a given area of soil and/or optics to allow for the detection of crop type, stage of grown, health, presence of disease, rate of growth and the like. The system may also receive include a weather station 126 or the like to measure weather features such as humidity, pressure, precipitation, solar radiation, temperature and the like. Additionally, the system may include wireless transceivers/routers 127, 129 for receiving and transmitting signals between system elements. Preferably, the data collected by the detectors and sensors of the present invention are forwarded to a main control panel 120 and control device 121 as discussed further below. Alternatively, the received data may be collected and retransmitted to a remote server/cloud for processing and analysis.

Figure 2:
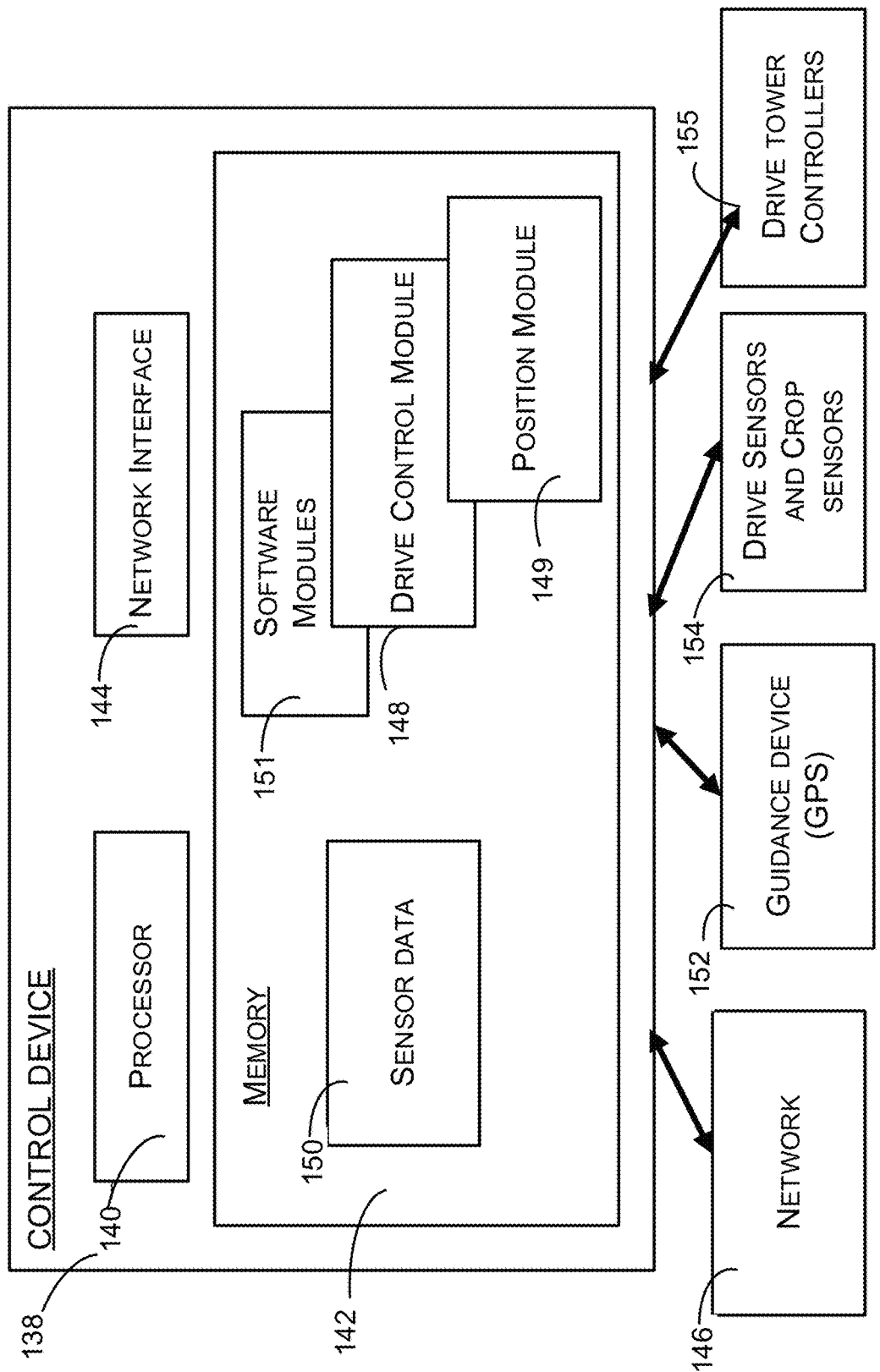
FIG. 2 shows a block diagram illustrating the exemplary processing architecture of a control device in according with a first preferred embodiment of the present invention.

With reference now to FIG. 2, an exemplary control device 138 which represents functionality to control one or more operational aspects of the irrigation system 100 will now be discussed. As shown, the exemplary control device 138 preferably includes a processor 140, a memory 142, software modules 151 and a network interface 144. The processor 140 provides processing functionality for the control device 138 and may include any number of processors, micro-controllers, or other processing systems. The processor 140 may execute one or more software modules/programs 151 that implement techniques described herein. The memory 142 may be any computer-readable media that provides storage functionality to store various data associated with the operation of the present invention, including software programs and code segments mentioned above, or other data to instruct the processor 140 and other elements of the control device 138 to perform the steps described herein. The network interface 144 preferably provides functionality to enable the control device 138 to communicate with one or more networks 146 through a variety of components such as wireless access points, transceivers and so forth, and any associated software employed by these components (e.g., drivers, configuration software, and so on).

In implementations, the control device 138 preferably includes a position-determining module 149 which may receive input data from a global positioning system (GPS) receiver 152 or the like to calculate a location of the irrigation system 100. Further, the control device 138 may be coupled to various drive tower controllers 155 to control and coordinate the movement of the irrigation system 100. As shown, the control device 138 may further include a drive control module 148 to assist in controlling the movement of the system. Further, the control device 138 may preferably further include multiple inputs and outputs to receive data from sensors 154 and monitoring devices as discussed further below.

According to a preferred embodiment of the present invention, the control device 138 of the present invention may preferably receive data such as: system data, field mapping data, water pressure, and weather data (which may preferably include wind speed, wind direction, humidity and barometric pressure) from the sensor systems as discussed further below. Further, the processor may receive and access irrigation path and variable rate irrigation (VRI) related data which may further include water application rates, machine speed and motor operations data.

Preferably, the drive control module 148 receives continual updates from all sensors and systems of the present invention so that it may dynamically calculate and update the target motor speeds of the irrigation system in real-time as the irrigation system executes a given watering plan. Further, the drive control module 148 may preferably be programmed to receive and adjusts target motor speeds based on data such as: the variable rate prescription being executed; irrigation map data (i.e. GPS dimensions of a given field); soil/crop data (crop type, growth stage, irrigation history, soil type and/or measured soil moisture; weather data (including storm events, humidity, temperature, wind speed and direction); movement data (including speed and direction of the irrigation machine); and topographical data (including data regarding obstacles and the slope of the terrain to be irrigated); as well as safety zones, guidance tower speed, max ET ratio, minimum Arc Radius, full or partial circle, max/min trajectories, start/end angles and the like. Additionally, the drive control module 148 may adjust target motor speeds based on whether the irrigation system is actively spraying or returning to a starting position. This is especially true for linear machines which often need to quickly return to their starting location to initiate a second irrigation cycle before the starting end of the field sees water stress.

Regarding obstacles, the drive control module 148 may increase or decrease target speeds in order to move out of the way of in-field implements such as tractors, planters, sprayers, combines, etc. in order to quickly allow other field operations to occur efficiently. For storm event, the drive control module 148 change the target speed of the system to quickly reposition itself into a downwind or upwind orientation based on a weather warning, wind speed and direction indication or the like.

Regarding a variable rate irrigation (VRI) prescription data, the drive control module 148 may increase target speeds in order to quickly apply a very light application of water to certain areas of the field. The drive control module 148 may also analyze the VRI data to trigger a higher rate of speed so that a total irrigation cycle is completed quickly enough to allow the system to initiate a second irrigation cycle to keep up with crop water consumption or to ensure a more uniform soil moisture profile in the field. For example, a machine such as a linear or part-circle irrigation machine may need to quickly move back to a starting position in order to initiate a follow-on irrigation cycle. Such movement may be initiated based on VRI prescription data, detected soil moisture levels and the like. Further, the movement may be based on combinations of detected values such as crop type, growth stage, weather forecast, irrigation history, and/or soil type.

The drive control module 148 may also analyze VRI prescriptions and trigger higher motor speeds when higher concentrations of certain chemicals and fertilizers are desirable, so minimal excess water is applied to the crop. Further, signals from a soil moisture sensor and a crop sensor, satellite, image or the like could be used to initiate a high speed chemigation or fertigation pass. Additionally, a wind indication in combination with a given crop growth stage may initiate a higher motor speed in order to put down a light wetting pass to ensure soils don't blow and damage newly emerged crop. Still further, crop stress indications (e.g. NDVI, Crop Water Stress Index and other similar parameters) could be used by the drive control module 148 to increase machine speeds.

According to a further preferred embodiment, the drive sensors 154 may preferably include an analog, non-contact alignment sensor (or the like) which may provide an alignment signal to a controller which in turn controls and/or adjusts the speed of the motor. According to a further preferred embodiment, the motor of the present invention may preferably be a variable speed motor which is capable of rotational speeds up to and/or greater than 3600 RPM.

According to a further preferred embodiment, the motor for use with the present invention may preferably be any motor capable of supplying torque at partial speeds equal to or greater than the rated torque at full speed for use on an irrigation system. For example, the preferred motor may be a SR motor or a DC motor (such as a permanent magnet DC motor) or the like as discussed further below. According to a still further preferred embodiment, the drive system of the present invention may preferably further include a 52:1 helical center drive gearbox and a 52:1 worm wheel gearbox. Alternatively, other configurations may also be used including: a 40:1 helical center-drive gearbox and a 50:1 worm wheel gearbox, or a 20:1 worm drive gearbox and a 52:1 worm wheel gearbox.

According to a further preferred embodiment, the present invention may achieve additional speed by reducing the reduction ratio of the center drive or wheel gearboxes. In accordance with a further preferred embodiment, additional speed may further be gained by increasing the rotational speed of the motor. According to further preferred embodiments, an AC induction motor with a variable frequency drive reading a proportional input signal, a standard micro switch-contactor-start/stop motor with smaller reduction gearboxes, larger diameter tires and/or a combination thereof may further be preferably used.

According to a further alternative preferred embodiment, the motor of the present invention may preferably be DC motor. According to a further preferred alternative embodiment invention, the motor of the present invention may preferably be a switched reluctance motor (SRM).

According to a preferred embodiment, an irrigation machine in accordance with the present invention may preferably achieve and maintain ground speeds in excess of 27 ft./min. According to further preferred embodiments, irrigation machines in accordance with the present invention may further preferably achieve and maintain ground speeds in the range of 27-36 ft./min. According to still further preferred embodiments, irrigation machines in accordance with the present invention may further preferably achieve and maintain ground speeds in excess of 36 ft/min.

Figure 3:
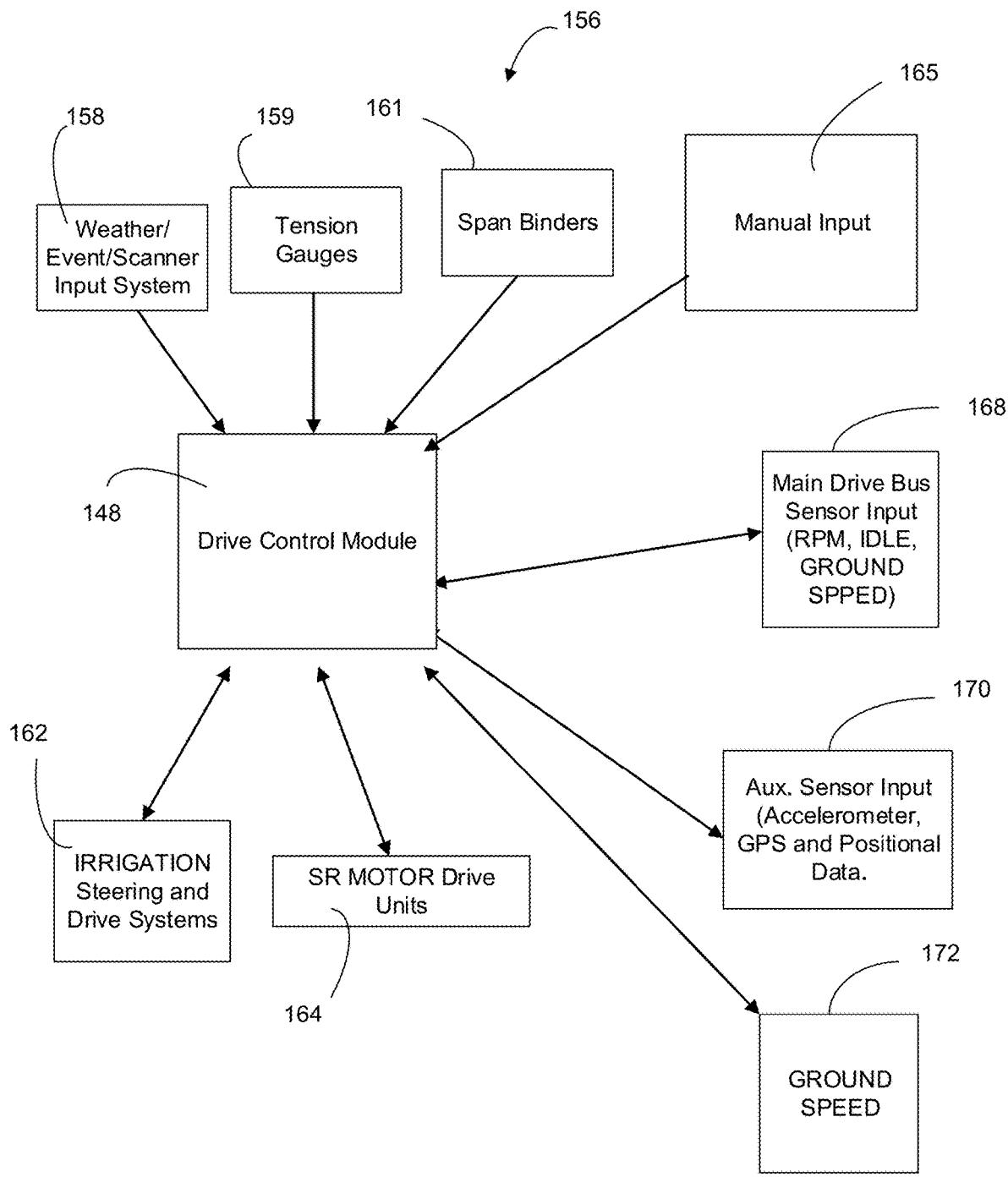
FIG. 3 shows a block diagram in accordance with further preferred embodiment of the present invention.

With reference now to FIG. 3, an exemplary control and data processing system 156 incorporating aspects of the present invention shall now be further discussed. As shown, the exemplary irrigation system 156 includes a drive control module 148 (as discussed above) which receives and processes data from a variety of sources. Although shown and discussed as a single module, the functions of the drive control module 148 (as well as the control device 138 and processor 140) may be distributed between multiple modules and/or processing elements within a single location or distributed further to one or more separate control panels or remote processing elements (i.e. servers, networked systems and the like).

With reference to FIG. 3, the drive control module 148 preferably receives one or more drive data inputs which it processes and analyzes to create control instructions for the irrigation steering/drive systems 162 and the individual drive units (i.e. SR motors) 164. As shown in FIG. 3, the drive data inputs to the system may preferably include: input from drive bus 168 which may preferably include machine related drive data such as RPM, commanded speed, stop, wheel position, and the like. The input data may preferably further include input from auxiliary sensors 170 which preferably may include inputs such as: GPS location data, accelerometer data, vehicle orientation/position data and the like. Further, the input data preferably may further include ground speed data 172. Further, the input data may also include manual inputs 165 to direct the system. Additionally, the system may preferably further include environmental sensor inputs 158 which may preferably provide a variety of data including: data regarding irrigation map data (i.e. dimensions of a given field); weather data (including humidity, temperature, wind speed and direction); and topographical data (including data regarding the slope of the terrain to be irrigated). Preferably, received data from all sources may preferably be processed to define and optimize the speed and the variable rate operational state of each individual drive unit 164 of the irrigation system 156.

Figure 4:
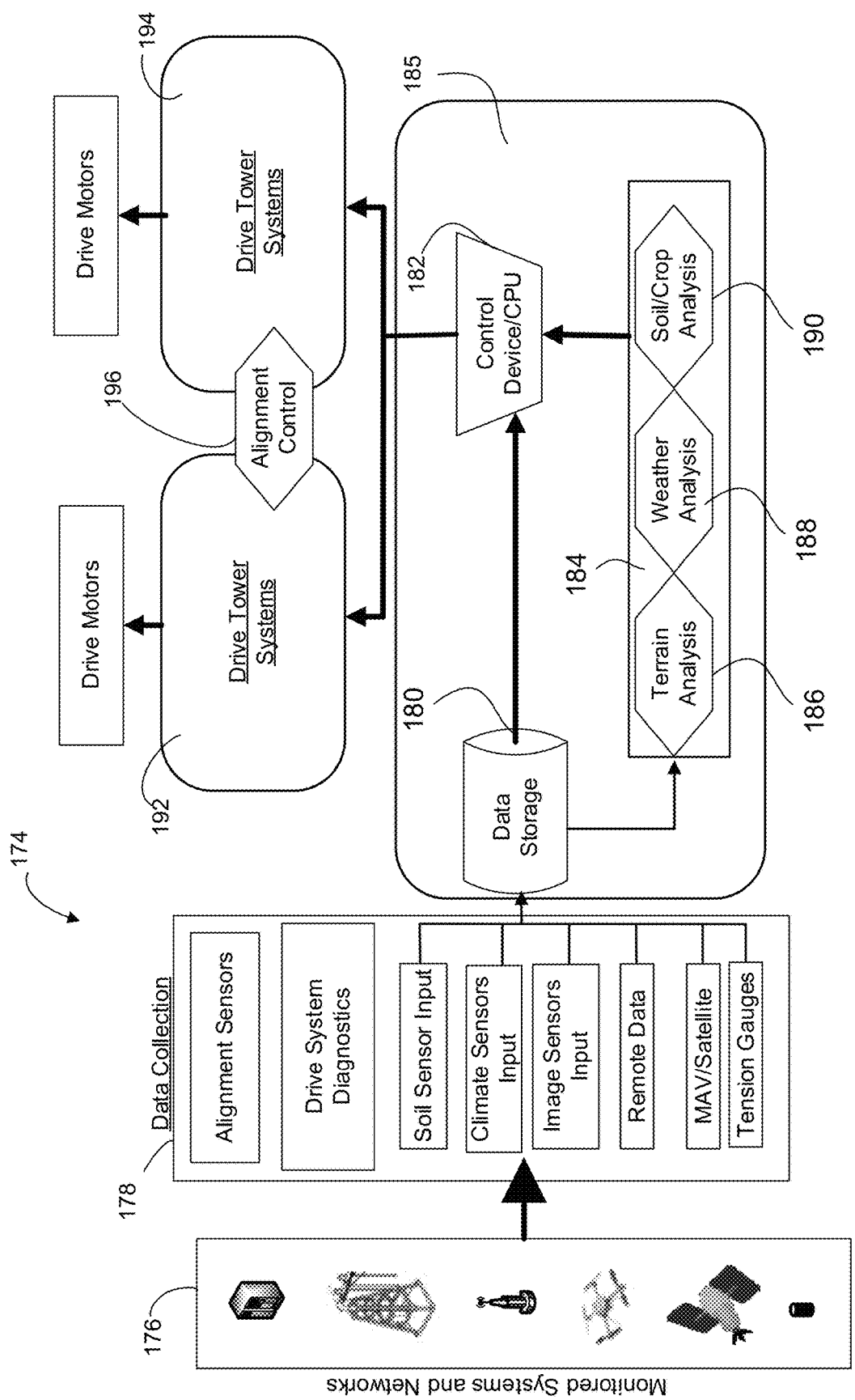
FIG. 4 shows a flow diagram in accordance with a further preferred embodiment of the present invention.

With reference now to FIG. 4, a high-level block diagram is provided illustrating exemplary aspects of the present invention and the drive control module 148. As shown, data and sensor systems 176 of the present invention preferably provide input signals to through the system data collection inputs 178. Thereafter, the data is provided to the main control device 185 where the data is stored in data storage 180 for processing. The stored data is then preferably further processed by the device CPU 182 and the drive control module 184 as discussed herein.

In accordance with preferred aspects of the present invention, an irrigation machine incorporating the present invention may preferably manage the variable speed of a given irrigation system and allow for high ground speeds to be properly used and controlled. The use of this system allows the expansion of the application rates and a reduction in the overall operating time and overall energy consumed in an irrigation cycle. To allow for higher speeds, the collected data 178 is preferably analyzed to determine a top recommended speed for the irrigation span and/or to generate other system parameters based on a recommended or requested speed. For example, the system may preferably analyze the terrain 186, the weather 188, and soil 190 to detect and analyze conditions suitable for faster irrigation speeds. Regarding terrain 186, the system may analyze recorded data regarding the slope of the terrain to ensure the drive motors can safely produce the requested speeds. Further, the system may analyze, calculate, and retrieve obstacle data regarding ruts and other obstacles which could pose a risk to the machine operating at higher speeds. Regarding weather, the system may analyze potential high winds and their direction. The system may also analyze recent or expected precipitation along with soil/crop analysis to determine the traction available. Running at higher speeds requires greater traction and creates greater risks of slippage and misalignment. Therefore, for example, if the system calculates low traction, the control device 185 may reduce the top recommended/allowed speed accordingly. The system may also retrieve or perform soil/crop analysis 190 to determine the existing crop height.

At a first exemplary step, the control device 185 may first calculate a top recommended speed. Along with the top recommended speed, the system preferably determines alignment tolerances and may adjust alignment parameters within the alignment control system 196 to ensure safe running and proper alignment between the drive tower systems 192, 194 at the recommended speed. In particular, the system may preferably increase the frequency of alignment checks and alignment adjustments in a high-speed mode. Further, the system may decrease alignment tolerances to create greater safety windows at higher speeds. During higher speed travel, the systems of the present invention preferably continually receive sensor data and feedback to create alerts for obstacles, alignment issues, and potential strain within the system.

While the above descriptions regarding the present invention contain much specificity, these should not be construed as limitations on the scope, but rather as examples. Many other variations are possible. For example, the processing elements of the present invention by the present invention may operate on a number of frequencies. Further, the communications provided with the present invention may be designed to be duplex or simplex in nature. Further, as needs require, the processes for transmitting data to and from the present invention may be designed to be push or pull in nature. Still, further, each feature of the present invention may be made to be remotely activated and accessed from distant monitoring stations. Accordingly, data may preferably be uploaded to and downloaded from the present invention as needed.

Accordingly, the scope of the present invention should be determined not by the embodiments illustrated, but by the appended claims and their legal equivalents.

What is claimed is:

1. A control system for use with a mechanized irrigation system, wherein the mechanized irrigation system includes at least a first conduit secured to a first span which is supported by a first drive tower having a first drive tower controller, a first drive motor and a first drive wheel; and a second conduit secured to a second span which is supported by a second drive tower which includes a second drive tower controller, second drive motor and a second drive wheel; the control system comprising:

a first motor control system, wherein the first motor control system receives inputs and adjusts the operational status of the first drive motor; and a second motor control system, wherein the second motor control system receives inputs and adjusts the operational status of the second drive motor;

wherein the first and second motor control systems are configured to vary a drive motor characteristic in response to a drive command; wherein the drive motor characteristic is selected from the group of drive motor characteristics comprising: electrical pulse rate, voltage, RPM, current and frequency; wherein the drive command comprises a commanded speed of the irrigation machine;

a drive control system, wherein the drive control system transmits drive commands to the first motor control system and the second motor control system; wherein the drive control system determines the commanded speed based on detected input condition data; wherein the detected input condition data comprises data selected from the group of detected input condition data comprising: slope of terrain, soil moisture levels, precipitation levels, soil compaction, obstacles, wind speed, wind direction, crop height, time remaining to start new irrigation cycle, irrigation scheduling forecast, crop type, growth stage, weather forecast, irrigation history, soil type, measured soil moisture, field equipment location, obstacle detection, chemical concentration levels, fertilizer concentration levels, chemical type, fertilizer type, NDVI, and Crop Water Stress Index;

wherein the drive control system is configured to adjust a system parameter based on the commanded speed; wherein the system parameter is selected from the group of parameters comprising: alignment tolerance, timing of alignment checks, and timing of alignment corrections;
wherein the alignment tolerance comprises a threshold limit for the angle between the first span and the second span.

2. The system of claim 1, wherein the alignment tolerance is lowered in response to a higher commanded speed.

3. The system of claim 2, wherein the alignment data is reported more frequently in response to a higher commanded speed.

4. The system of claim 1, wherein the drive control system is configured to transmit an alert if at least one system parameter exceeds a threshold for the commanded speed.

5. The system of claim 4, wherein the first drive motor is a motor capable of providing full-speed torque at speeds lower than the rated speed of the motor.

6. The system of claim 5, wherein the first and second drive motors are capable of an RPM rate that will produce a ground speed of an irrigation system tower structure in excess of 36 ft./min.

7. A control system for use with a mechanized irrigation system, wherein the mechanized irrigation system includes at least a first conduit secured to a first span which is supported by a first drive tower having a first drive tower controller, a first drive motor and a first drive wheel; and a second conduit secured to a second span which is supported by a second drive tower which includes a second drive tower controller, second drive motor and a second drive wheel; the control system comprising:
  a first motor control system, wherein the first motor control system receives inputs and adjusts the operational status of the first drive motor; and
  a second motor control system, wherein the second motor control system receives inputs and adjusts the operational status of the second drive motor;
  wherein the first and second motor control systems are configured to vary a drive motor characteristic in response to a drive command; wherein the drive motor characteristic is selected from the group of drive motor characteristics comprising: electrical pulse rate, voltage, RPM, current and frequency; wherein the drive command comprises a commanded speed of the irrigation machine;
  a drive control system, wherein the drive control system transmits drive commands to the first motor control system and the second motor control system; wherein the drive control system determines the commanded speed based on detected input condition data; wherein the detected input condition data comprises data selected from the group of detected input condition data comprising: slope of terrain, soil moisture levels, precipitation levels, soil compaction, obstacles, wind speed, wind direction, crop height, time remaining to start new irrigation cycle, irrigation scheduling forecast, crop type, growth stage, weather forecast, irrigation history, soil type, measured soil moisture, field equipment location, obstacle detection, chemical concentration levels, fertilizer concentration levels, chemical type, fertilizer type, NDVI, and Crop Water Stress Index;
  wherein the drive control system is configured to adjust a system parameter based on the commanded speed; wherein the system parameter is selected from the group of parameters comprising: alignment tolerance, timing of alignment checks, and timing of alignment corrections;
  wherein the alignment tolerance comprises a threshold limit for the angle between the first span and the second span;
  wherein the detected input condition data comprises the slope of the terrain to be irrigated.

8. The system of claim 7, wherein the detected input condition data comprises the precipitation levels of the area to be irrigated.

9. The system of claim 7, wherein the detected input condition data comprises the presence of an obstacle within the area to be irrigated.

10. The system of claim 7, wherein the detected input condition data comprises the wind speed and the wind direction within the area to be irrigated.

11. The system of claim 10, wherein the detected input condition data comprises the wind speed within the area to be irrigated.

12. The system of claim 7, wherein the detected input condition data comprises the time remaining to start a new irrigation cycle within the area to be irrigated.

13. The system of claim 7, wherein the detected input condition data comprises the irrigation scheduling forecast for the area to be irrigated.

14. The system of claim 7, wherein the detected input condition data comprises the crop type and growth stage for a crop within the area to be irrigated.

15. The system of claim 14, wherein the detected input condition data comprises the crop height within the area to be irrigated.

16. The system of claim 7, wherein the detected input condition data comprises the Crop Water Stress Index for the area to be irrigated.

17. The system of claim 7, wherein the detected input condition data comprises the soil type within the area to be irrigated.

18. The system of claim 7, wherein the detected input condition data comprises the type and concentration level of a chemical to be applied within the area to be irrigated.

19. The system of claim 7, wherein the detected input condition data comprises the type and concentration level of a fertilizer to be applied within the area to be irrigated.

20. The system of claim 7, wherein the detected input condition data comprises NDVI data for the area to be irrigated.

* * * * *